United States Patent
Iwayama

(10) Patent No.: US 12,306,057 B2
(45) Date of Patent: May 20, 2025

(54) FORCE SENSOR DIAGNOSTIC DEVICE AND ROBOT CONTROL DEVICE

(71) Applicant: FANUC CORPORATION, Yamanashi (JP)

(72) Inventor: Takatoshi Iwayama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 349 days.

(21) Appl. No.: 17/797,957

(22) PCT Filed: Feb. 26, 2021

(86) PCT No.: PCT/JP2021/007237
§ 371 (c)(1),
(2) Date: Aug. 5, 2022

(87) PCT Pub. No.: WO2021/177147
PCT Pub. Date: Sep. 10, 2021

(65) Prior Publication Data
US 2023/0040101 A1 Feb. 9, 2023

(30) Foreign Application Priority Data
Mar. 5, 2020 (JP) .................................. 2020-037862

(51) Int. Cl.
*G01L 25/00* (2006.01)
*B25J 13/08* (2006.01)
*B25J 19/02* (2006.01)

(52) U.S. Cl.
CPC ............. *G01L 25/00* (2013.01); *B25J 13/085* (2013.01); *B25J 19/02* (2013.01); *G05B 2219/40582* (2013.01)

(58) Field of Classification Search
CPC . G01L 25/00; G01L 1/26; B25J 9/1674; B25J 13/085; G05B 2219/40582
See application file for complete search history.

(56) References Cited

U.S. PATENT DOCUMENTS

2006/0059975 A1* 3/2006 Kawaguchi ............. G01L 25/00
73/1.13
2016/0031086 A1 2/2016 Tanabe et al.
(Continued)

FOREIGN PATENT DOCUMENTS

JP H07-019982 A 1/1995
JP H07-077476 A 3/1995
(Continued)

OTHER PUBLICATIONS

International Search Report mailed Apr. 27, 2021, in corresponding to International Application No. PCT/JP2021/007237; 6 pages (with English Translation).

*Primary Examiner* — Manuel L Barbee
(74) *Attorney, Agent, or Firm* — Maier & Maier, PLLC

(57) ABSTRACT

A force sensor diagnostic device that diagnoses a force sensor provided in a robot, the force sensor disposed near an installation surface on which the robot is installed and detecting a force and a moment applied to the robot from an outside. The device includes a calculation unit that calculates a theoretical value of the force and a theoretical value of the moment detected by the force sensor, a determination unit that determines whether the force sensor is distorted by comparing an actually measured value of the force and an actually measured value of the moment detected by the force sensor with the theoretical values of the force and the moment, and a notification unit that notifies a determination result from the determination unit.

14 Claims, 9 Drawing Sheets

(56) References Cited

U.S. PATENT DOCUMENTS

| | | | |
|---|---|---|---|
| 2016/0327934 A1* | 11/2016 | Morimoto | B25J 9/1653 |
| 2017/0028565 A1* | 2/2017 | Matsudaira | B25J 9/1674 |
| 2018/0133902 A1 | 5/2018 | Inoue et al. | |
| 2020/0030981 A1 | 1/2020 | Kamiya et al. | |

FOREIGN PATENT DOCUMENTS

| | | |
|---|---|---|
| JP | 2006-082201 A | 3/2006 |
| JP | 2012051042 A | 3/2012 |
| JP | 2012218094 A | 11/2012 |
| JP | 201313988 A | 1/2013 |
| JP | 2013094935 A | 5/2013 |
| JP | 2014058029 A | 4/2014 |
| JP | 2016083710 A | 5/2016 |
| JP | 2017030081 A | 2/2017 |
| JP | 2018-080941 A | 5/2018 |
| JP | 2019-042906 A | 3/2019 |
| JP | 2020-019067 A | 2/2020 |
| JP | 20213738 A | 1/2021 |
| WO | 2015/145638 A1 | 10/2015 |
| WO | 2018029790 A1 | 2/2018 |
| WO | 2018/042571 A1 | 3/2018 |

* cited by examiner

FIG. 7

| MODE | CORRECTION METHOD |
|---|---|
| MODE 1 | CHECK LOAD SETTING. IF DIAGNOSIS AFTER THAT IS STILL MODE 1, THEN CHECK INSTALLATION STATE. |
| MODE 2 | CHECK LOAD SETTING. |
| MODE 3 | CHECK INSTALLATION STATE |

FIG. 10

| DETERMINATION | SENSOR DIAGNOSIS RESULT |
|---|---|
| A | EXCELLENT |
| B | GOOD |
| C | POOR |
| D | BAD |

FORCE SENSOR DIAGNOSTIC DEVICE AND ROBOT CONTROL DEVICE

TECHNICAL FIELD

The present invention relates to a force sensor diagnostic device and a robot control device.

BACKGROUND

Industrial robots are conventionally provided with a force sensor that detects an external force applied to the robot to detect contact of the robot with an object or a person (e.g., see Japanese Unexamined Patent Application, Publication No. 2019-042906 and Japanese Unexamined Patent Application, Publication No. 2018-080941). In Japanese Unexamined Patent Application, Publication No. 2019-042906 and Japanese Unexamined Patent Application, Publication No. 2018-080941, a force sensor is disposed near an installation surface on which a robot is installed.

SUMMARY

One aspect of this disclosure is a force sensor diagnostic device that diagnoses a force sensor provided in a robot. The force sensor is disposed near an installation surface on which the robot is installed and detects a force and a moment applied to the robot from an outside. The force sensor diagnostic device includes: a calculation unit that calculates a theoretical value of the force and a theoretical value of the moment detected by the force sensor; a determination unit that determines whether the force sensor is distorted by comparing an actually measured value of the force and an actually measured value of the moment detected by the force sensor with the theoretical values of the force and the moment; and a notification unit that notifies a determination result from the determination unit.

BRIEF DESCRIPTION OF THE DRAWINGS

FIG. 7 is a table showing an example of a diagnosis result of a force sensor displayed by a notification unit.

FIG. 10 is a table showing a modified example of a determination result from the determination unit.

DETAILED DESCRIPTION OF THE EMBODIMENTS

Detection accuracy of a force sensor can decrease due to some cause. When a robot operates in a state where the detection accuracy of the force sensor has decreased, contact of the robot with an object or a person may not be correctly detected. Therefore, it is necessary to check that the detection accuracy of the force sensor meets a predetermined criterion before the robot starts operating. However, as there are several causes for a decrease in detection accuracy, it is not easy to identify the cause.

A force sensor diagnostic device, a robot control device, and a robot system according to one embodiment will be described below with reference to the drawings.

Figure 1:
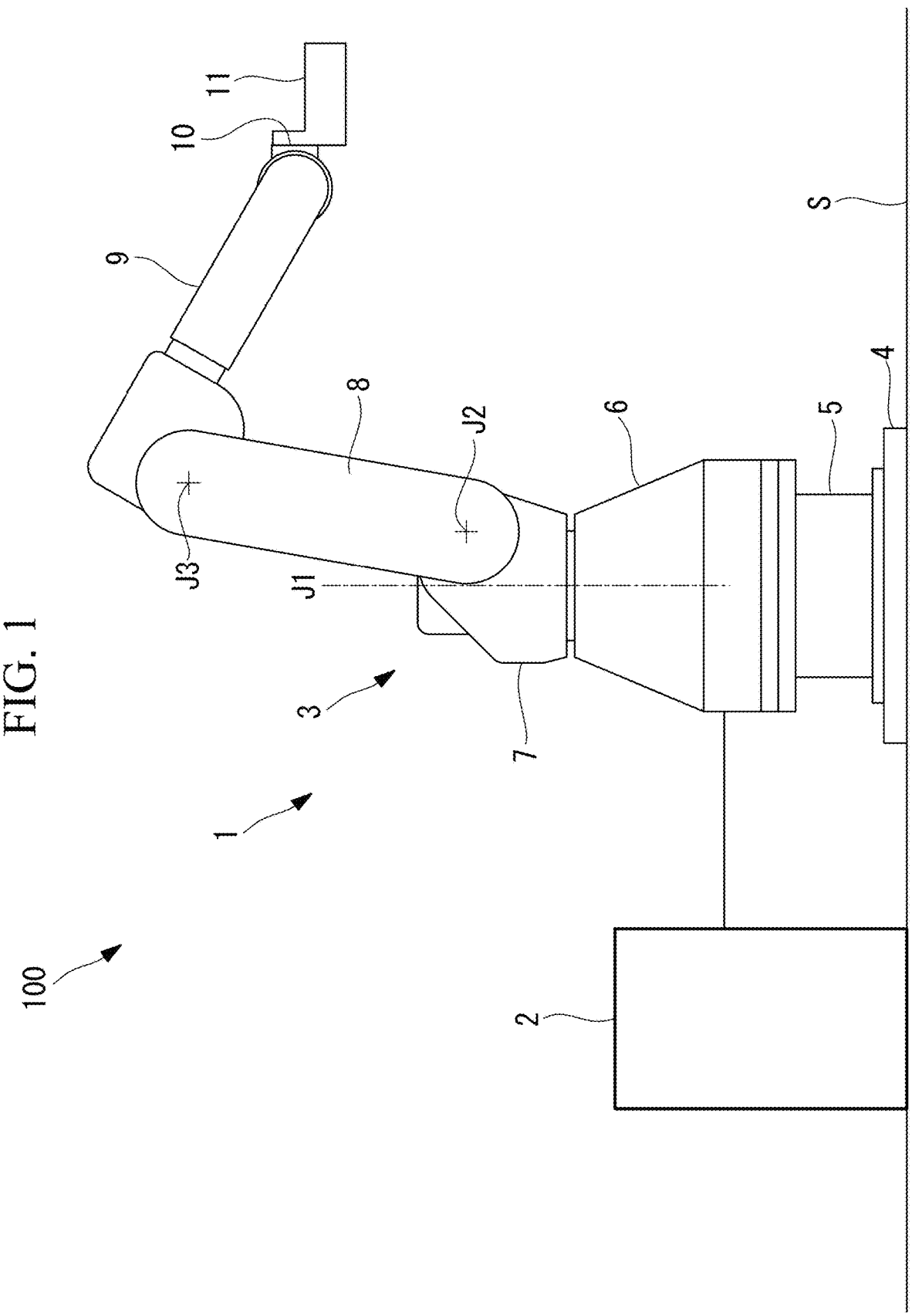
FIG. 1 is an overall configuration view of a robot system according to one embodiment.

As shown in FIG. 1, a robot system 100 according to the embodiment includes a robot 1 for industrial purposes, and a robot control device 2 that is connected to the robot 1 and controls the robot 1.

The robot 1 includes a robot main body 3, an installation plate 4 used to fix the robot main body 3 to an installation surface S, and a force sensor 5 that detects a force and a moment applied to the robot main body 3 from an outside. For example, the robot 1 is a cooperative robot that works in the same work space as workers, and the robot main body 3 is a six-axis vertical articulated robot.

The robot main body 3 has a base 6, a turning body 7, a first arm 8, and a second arm 9. The turning body 7 is placed on the base 6 and can rotate relatively to the base 6 around a first axis J1 oriented in a vertical direction. A proximal end portion of the first arm 8 is supported by the turning body 7 and can rotate relatively to the turning body 7 around a second axis J2 oriented in a horizontal direction. A proximal end portion of the second arm 9 is supported by a distal end portion of the first arm 8 and can rotate relatively to the first arm 8 around a third axis J3 oriented in a horizontal direction.

The robot main body 3 is provided with multiple servomotors (not shown) that rotate the turning body 7, the first arm 8, and the second arm 9, and multiple encoders (not shown) that detect rotation angles of the turning body 7, the first arm 8, and the second arm 9.

At a distal end of the second arm 9, a mount surface 10 to which a load 11 is mounted is provided. The load 11 is an end effector, for example, a hand, or a tool.

Figure 2A:
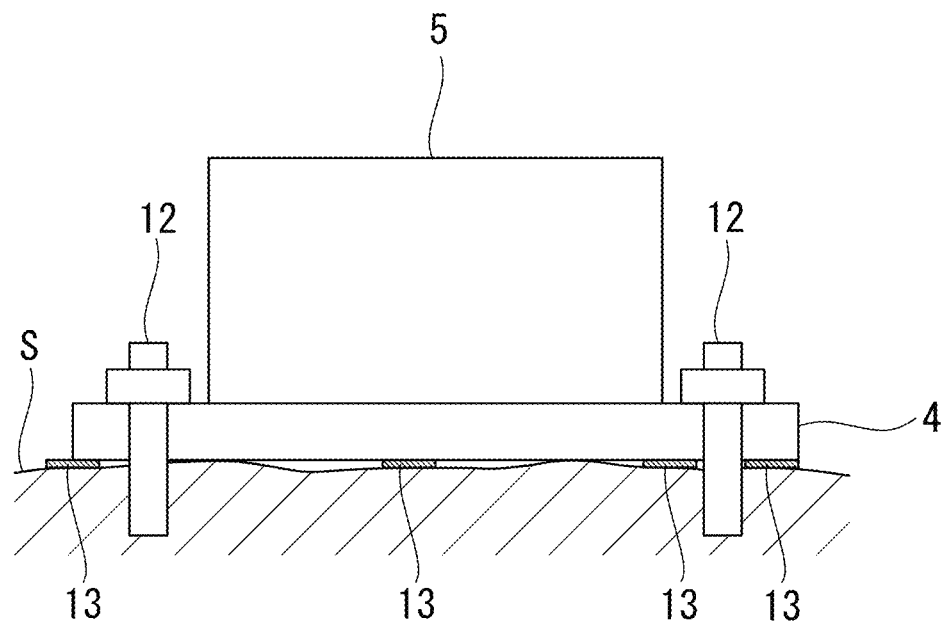
FIG. 2A is a view showing an example of correct installation of an installation plate.

As shown in FIG. 2A, the installation plate 4 is disposed on the installation surface S, such as a floor surface, that is horizontal or substantially horizontal, and is fixed to the installation surface S with an enormous force, for example, a force of a few tons, by means of anchor bolts 12, such as chemical anchors.

The force sensor 5 is disposed between the base 6 and the installation plate 4 and fixed to the base 6 and the installation plate 4. For example, the force sensor 5 has a cylindrical main body that distorts under an external force applied to the robot main body 3, and a plurality of strain sensors that is fixed to the main body. For example, the force sensor 5 is a six-axis force sensor, and a force detected by the force sensor 5 includes three force components in the directions of an X-axis, a Y-axis, and a Z-axis, and a moment detected by the force sensor 5 includes three moment components around the X-axis, the Y-axis, and the Z-axis. The X-axis, the Y-axis, and the Z-axis are orthogonal to one another.

The force sensor 5 disposed near the installation surface S is subjected to the influence of an installation state of the installation plate 4 on the installation surface S, and the force sensor 5 can distort due to the installation plate 4 being incorrectly installed on the installation surface S.

Figure 2B:
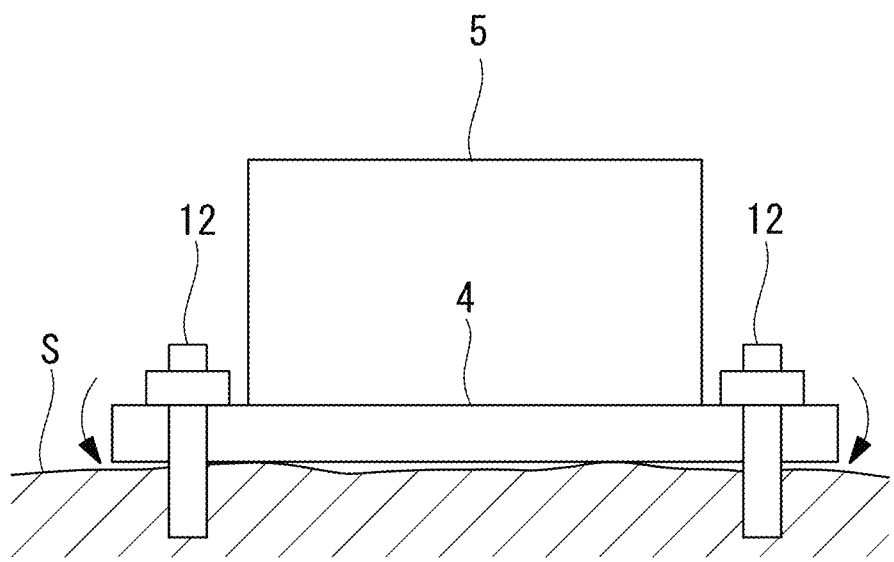
FIG. 2B is a view showing an example of incorrect installation of the installation plate.

FIG. 2A shows an example of correct installation of the installation plate 4, and FIG. 2B shows an example of incorrect installation of the installation plate 4. As shown in FIG. 2A, when the installation surface S is uneven, a shim 13 is inserted into the gap between the installation plate 4 and the installation surface S to secure the flatness of the installation plate 4. As shown in FIG. 2B, when the shim 13 is not inserted or not appropriately inserted, the installation plate 4 deforms under forces from the anchor bolts 12 as indicated by the arrows, and the force sensor 5 fixed to the installation plate 4 distorts.

Figure 3:
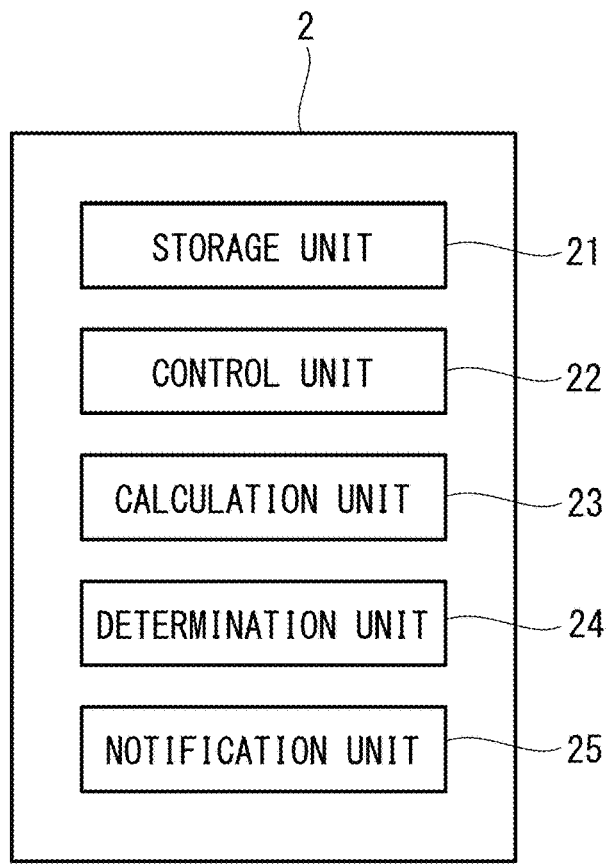
FIG. 3 is a functional block diagram of a robot control device according to one embodiment.

As shown in FIG. 3, the robot control device 2 includes a storage unit 21, a control unit 22, a calculation unit 23, a determination unit 24, and a notification unit 25.

The robot control device 2 has a sensor diagnosis function of diagnosing the force sensor 5, and the calculation unit 23, the determination unit 24, and the notification unit 25 are responsible for the sensor diagnosis function. Thus, in one embodiment, a force sensor diagnostic device is installed in the robot control device 2 as a part of the robot control device 2.

The storage unit 21 stores a sensor diagnosis program for diagnosing the force sensor 5. The robot control device 2 has a processor, and when the processor executes a process in accordance with the sensor diagnosis program, the functions of the control unit 22, the calculation unit 23, the determination unit 24, and the notification unit 25, to be described later, are realized.

Figure 4:
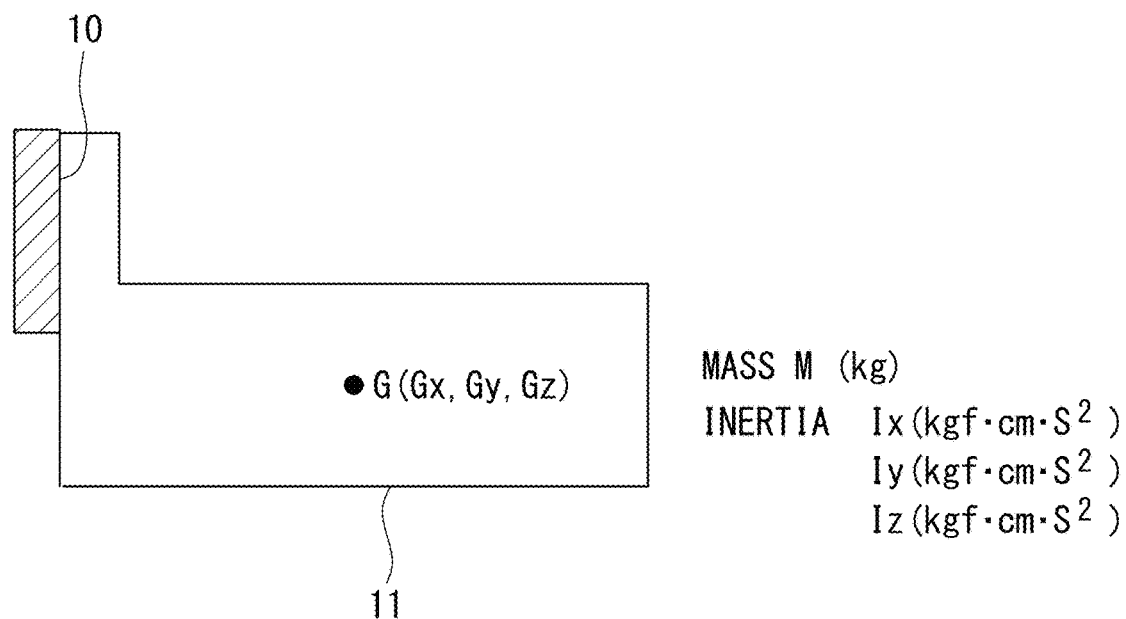
FIG. 4 is a view illustrating an example of set values of a load connected to a robot.

The storage unit 21 has a random-access memory (RAM), a read-only memory (ROM), and another optional storage device. The storage unit 21 stores set values of the load 11 connected to the robot 1. For example, as shown in FIG. 4, the set values include a mass M of the load 11, the position of the center of gravity (Gx, Gy, Gz) of the load 11 with respect to a center position of the mount surface 10, and inertias Ix, Iy, Iz of the load 11 around a center of gravity G. The set values are input into the robot control device 2 by a worker, for example, and stored in the storage unit 21.

The control unit 22 controls the robot main body 3 and the force sensor 5. By controlling the servomotors, the control unit 22 causes the robot main body 3 to execute a sensor diagnosis operation of changing the posture of the robot main body 3. The control unit 22 causes the force sensor 5 to detect a force and a moment while the posture of the robot main body 3 changes in the sensor diagnosis operation. Actually measured values Fa, Ma of the force and the moment detected by the force sensor 5 are sent from the force sensor 5 to the robot control device 2 and used to diagnose the force sensor 5.

Figure 5:
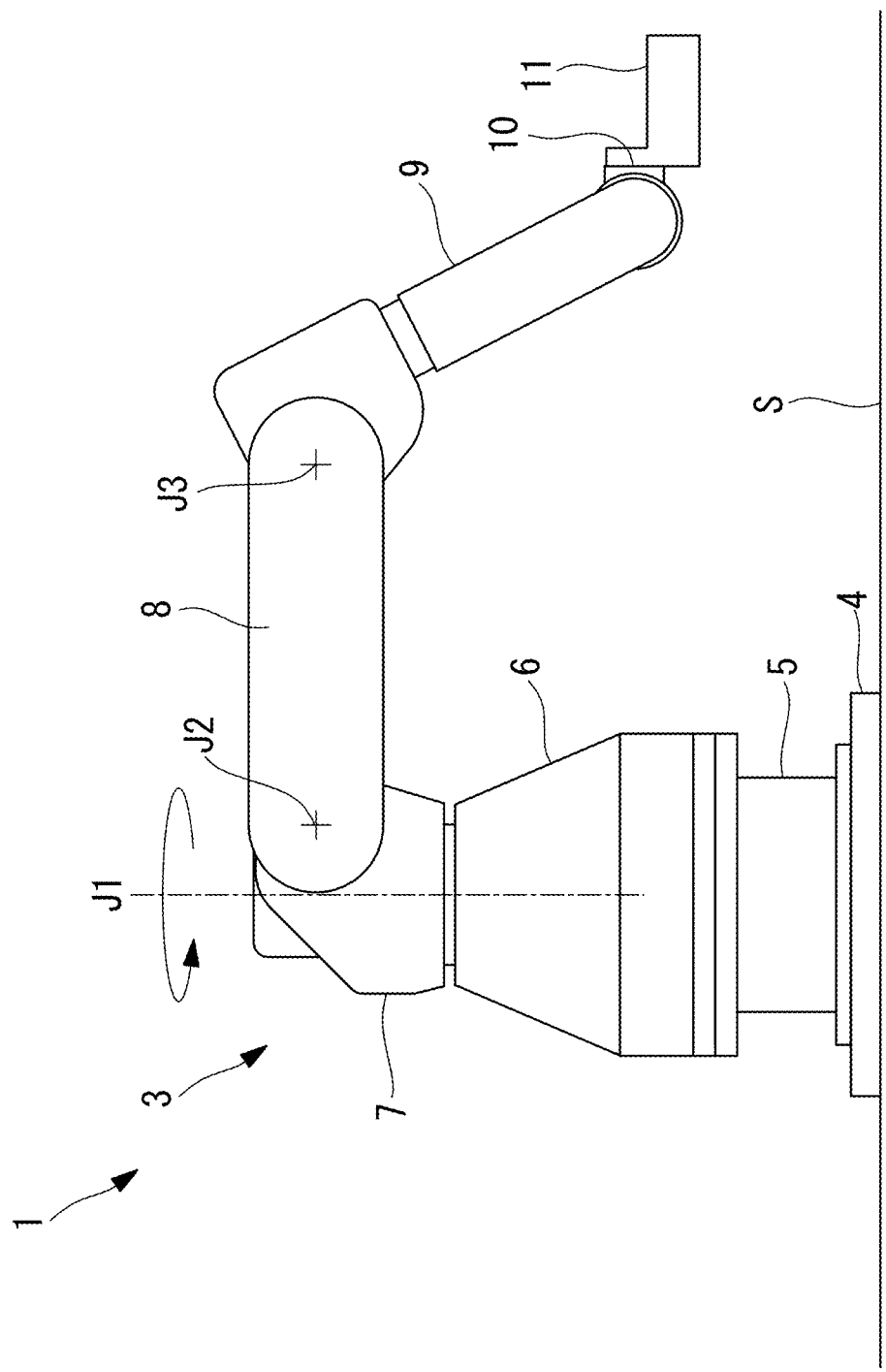
FIG. 5 is a view illustrating operation of a turning body of a robot main body in a sensor diagnosis operation.
Figure 6:
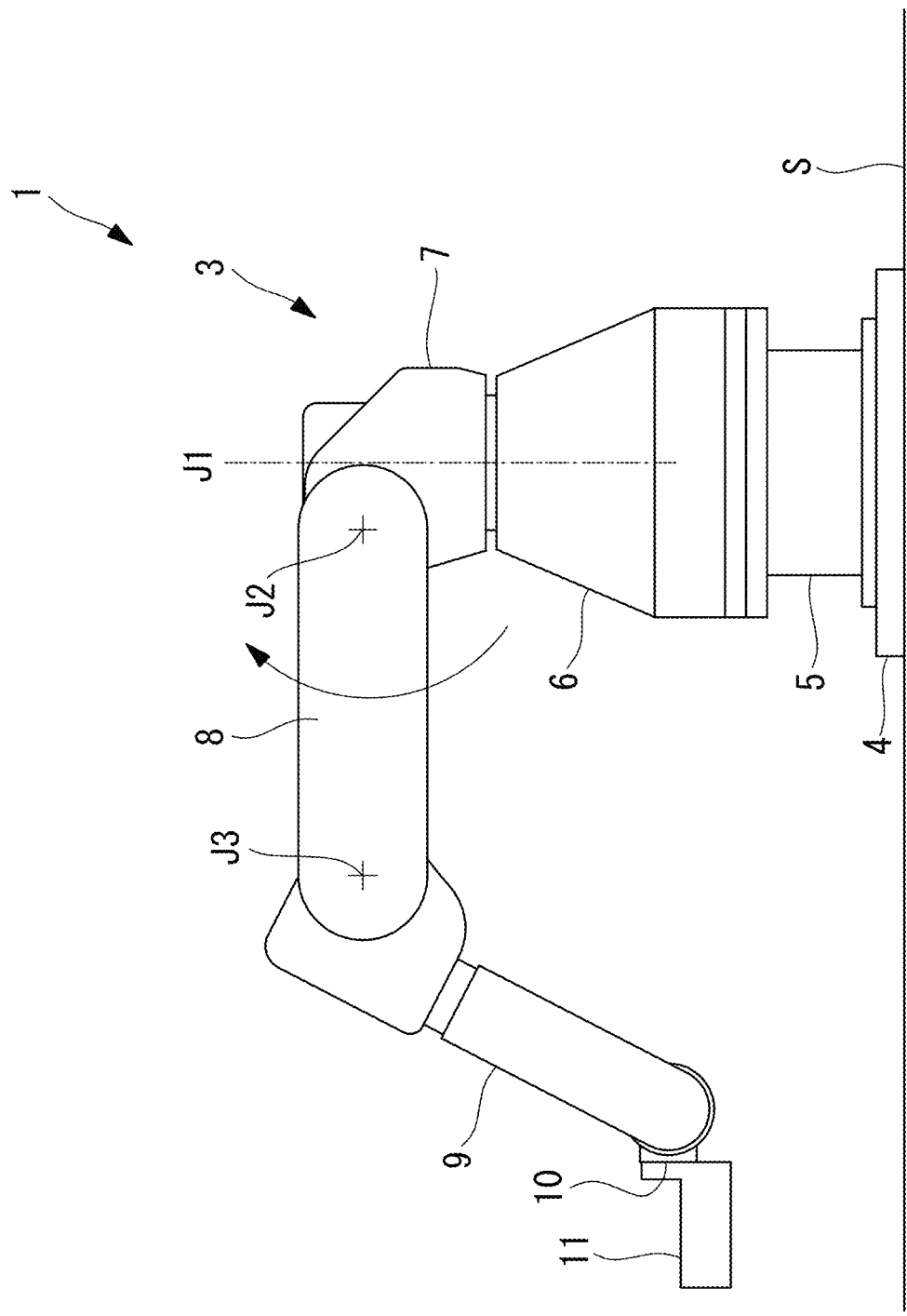
FIG. 6 is a view illustrating operation of a first arm of the robot main body in the sensor diagnosis operation.

FIG. 5 and FIG. 6 show the sensor diagnosis operation of the robot main body 3. In the sensor diagnosis operation, the posture of the robot main body 3 changes from an initial posture to a first posture by rotation of only the turning body 7 around the first axis J1 (see FIG. 5), and then changes from the first posture to a second posture by rotation of only the first arm 8 around the second axis J2 (see FIG. 6). The initial posture is a posture in which the load 11 is disposed at a position distant from the first axis J1 in the horizontal direction, for example, a posture in which the first arm 8 and the second arm 9 extend horizontally.

The rotation angle range of each of the turning body 7 and the first arm 8 in the sensor diagnosis operation is set to any range by a worker. It is preferable that the turning body 7 and the first arm 8 rotate to their maximum rotation angles, and that the amount of rotation of each of the turning body 7 and the first arm 8 be 90° or larger.

Figure 9A:
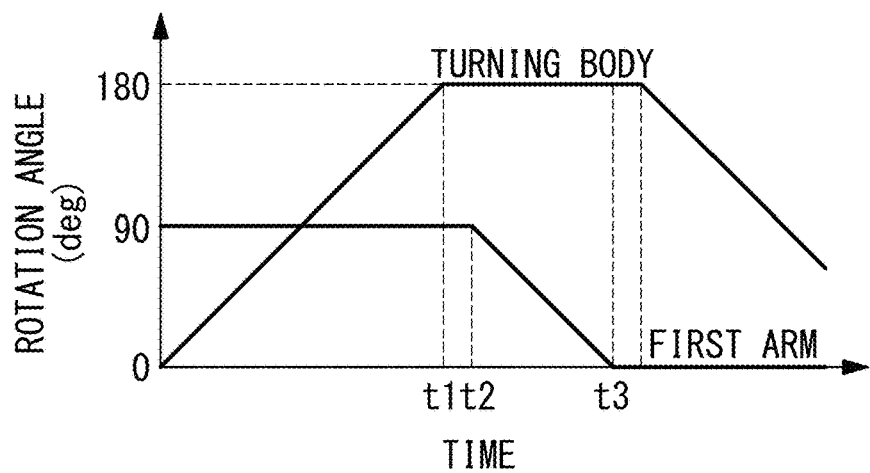
FIG. 9A is a graph showing changes over time in rotation angles of the turning body and the first arm in the sensor diagnosis operation.

For example, in the sensor diagnosis operation, the turning body 7 rotates from 0° to 180°, and the first arm 8 rotates from 90° to 0° (see FIG. 9A). Thus, in the initial posture, the rotation angle of the turning body 7 is 0° and the rotation angle of the first arm 8 is 90°. The first arm 8 extends in the horizontal direction at 90° and extends in the vertical direction at 0°.

The calculation unit 23 retrieves the set values of the load 11 from the storage unit 21 and, using the set values of the load 11, calculates theoretical values Ft, Mt of the force and the moment, respectively, that are detected by the force sensor 5 during the sensor diagnosis operation. For example, the theoretical value Ft is a root-mean-square of theoretical values of three force components in the directions of the X-axis, the Y-axis, and the Z-axis, and the theoretical value Mt is a root-mean-square of three moment components around the X-axis, the Y-axis, and the Z-axis.

When the theoretical values Ft, Mt change as the posture of the robot main body 3 changes, calculating the theoretical values Ft, Mt requires information on the posture of the robot main body 3. In such a case, the calculation unit 23 acquires information on the posture of the robot main body 3 at each moment during the sensor diagnosis operation. For example, the respective rotation angles of the turning body 7, the first arm 8, and the second arm 9 are sent from the encoders to the robot control device 2 and stored in the storage unit 21 in chronological order. The calculation unit 23 calculates the posture of the robot main body 3 at each moment from the rotation angles stored in the storage unit 21, and calculates the theoretical values Ft, Mt, using the set values of the load 11 and the posture of the robot main body 3.

As will be described in detail later, by comparing the actually measured values Fa, Ma with the theoretical values Ft, Mt, the determination unit 24 determines whether the set values of the load 11 are correct and whether the force sensor 5 is distorted due to incorrect installation of the installation plate 4. For example, the actually measured value Fa is a root-mean-square of three force components in the directions of the X-axis, the Y-axis, and the Z-axis that are actually detected by the force sensor 5, and the actually measured value Ma is a root-mean-square of three moment components around the X-axis, the Y-axis, and the Z-axis that are actually detected by the force sensor 5.

When it is determined that the set values of the load 11 are correct and it is determined that the force sensor 5 is not distorted, the determination unit 24 determines that the detection accuracy of the force sensor 5 is "acceptable."

On the other hand, when it is determined that the set values of the load 11 are incorrect and/or it is determined that the force sensor 5 is distorted, the determination unit 24 determines that the detection accuracy of the force sensor 5 is "not acceptable," and further selects one mode from among "mode 1," "mode 2," and "mode 3" based on the cause for being "not acceptable."

The notification unit 25 has a display (not shown) and displays a determination result from the determination unit 24 on the display. When the determination result is "acceptable," the notification unit 25 displays "acceptable." When the determination result is "not acceptable," as shown in FIG. 7, the notification unit 25 displays a mode selected by the determination unit 24 and a correction method corresponding to the selected mode.

Figure 8:
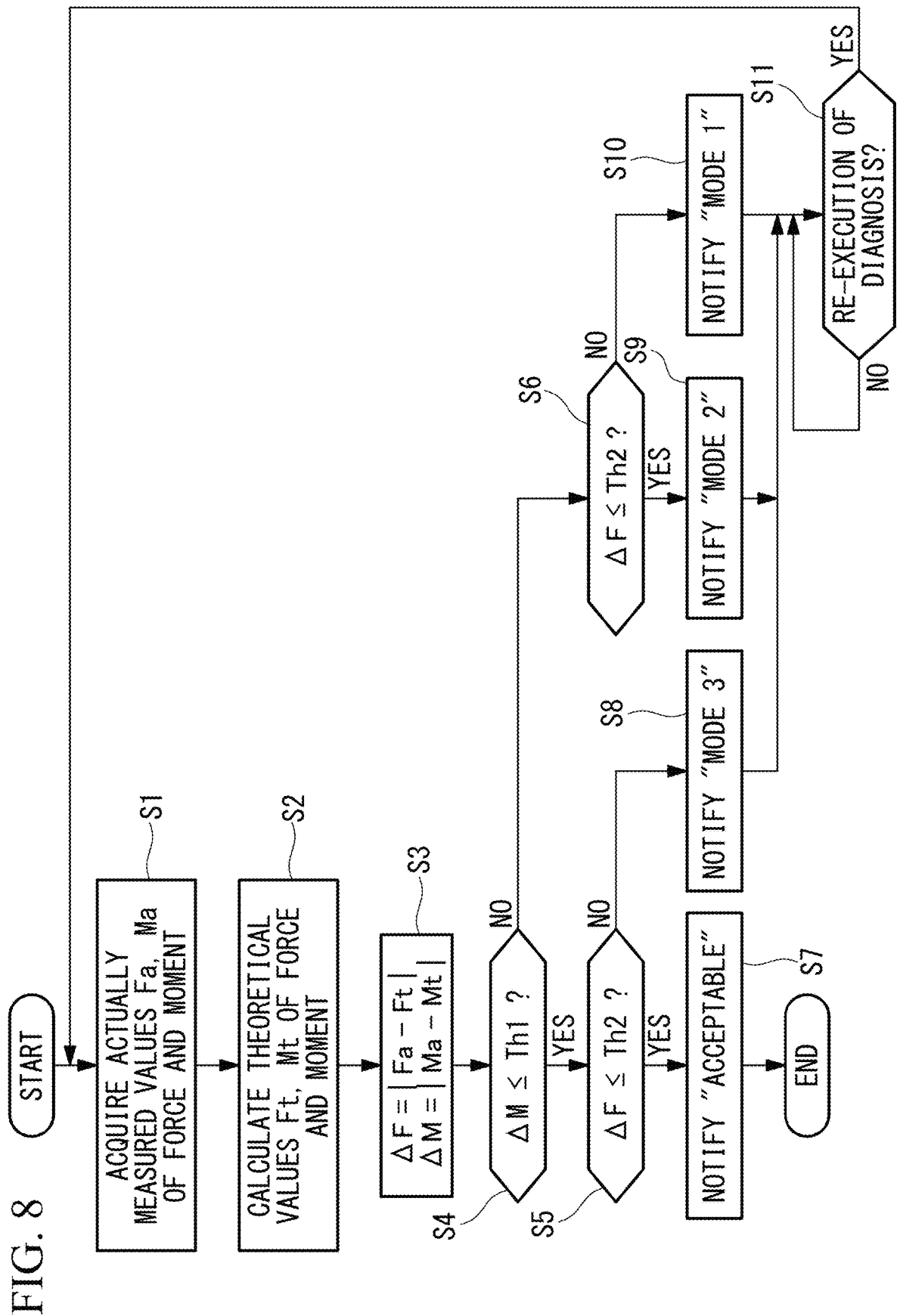
FIG. 8 is a flowchart showing a force sensor diagnosis method executed by the robot control device.

Next, a diagnosis method of the force sensor 5 executed by the robot control device 2 will be described with reference to FIG. 8. The robot control device 2 starts the diagnosis method of the force sensor 5 when the sensor diagnosis program is executed, for example, based on an instruction by a worker. The sensor diagnosis method is executed in a situation where a force and a moment are not applied to the robot main body 3 from the outside.

First, the control unit 22 controls the robot main body 3 and the force sensor 5 to thereby acquire the actually measured value Fa of a force and the actually measured value Ma of a moment (step S1). Specifically, the robot main body 3 executes the sensor diagnosis operation, and rotates the turning body 7 and rotates the first arm 8 sequentially. As a result, the posture of the robot main body 3 changes from the initial posture to the first posture, and subsequently changes from the first posture to the second posture. Then, the force and the moment are detected by the force sensor 5 while the turning body 7 rotates and the first arm 8 rotates.

Next, using the set values of the load 11 connected to the robot main body 3, the calculation unit 23 calculates the theoretical values Ft, Mt of the force and the moment detected by the force sensor 5 while the turning body 7 rotates and the first arm 8 rotates (step S2).

Next, the determination unit 24 calculates a force deviation $\Delta F=|Fa-Ft|$ that is the magnitude of the difference between the actually measured value Fa and the theoretical value Ft, and a moment deviation $\Delta M=|Ma-Mt|$ that is the magnitude of the difference between the actually measured value Ma and the theoretical value Mt (step S3).

The control unit 22 may set the zero point of the force sensor 5 such that the force and the moment detected by the force sensor 5 when the robot main body 3 is disposed in the initial posture are both zero and may thereafter change the posture of the robot main body 3. In this case, the theoretical values Ft, Mt calculated by the calculation unit 23 remain zero regardless of a change in the posture of the robot main body 3 from the initial posture.

Figure 9B:
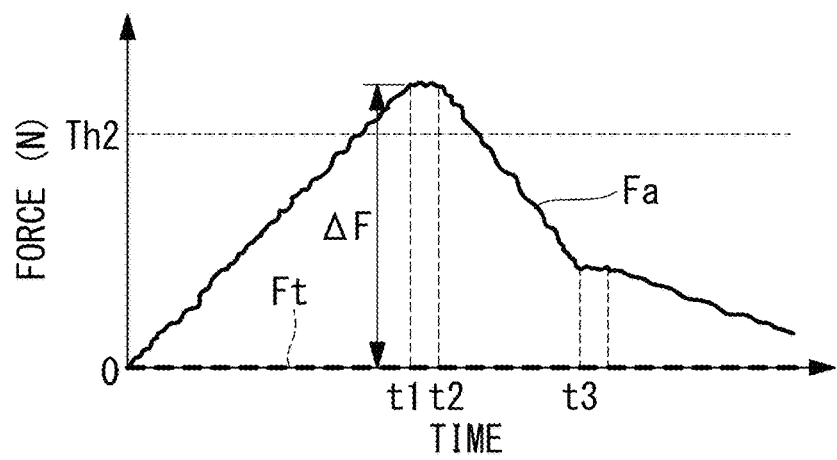
FIG. 9B is a graph showing changes over time in a force deviation ΔF in the sensor diagnosis operation.
Figure 9C:
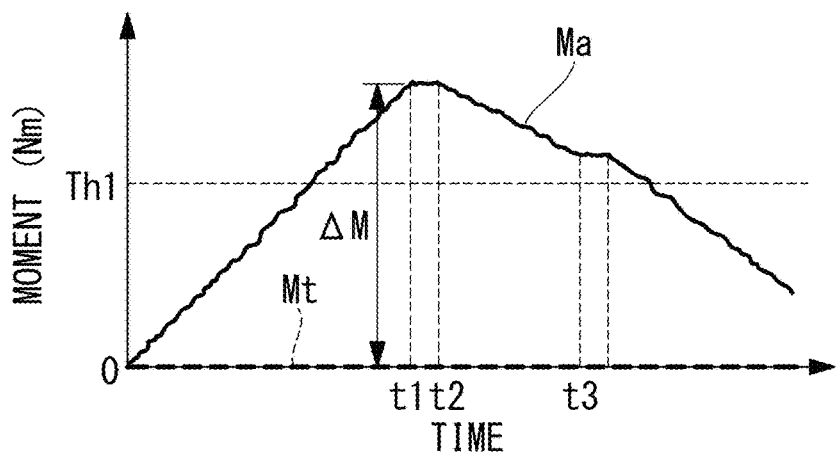
FIG. 9C is a graph showing changes over time in a moment deviation ΔM in the sensor diagnosis operation.

FIG. 9A shows changes over time in the rotation angles of the turning body 7 and the first arm 8 during the sensor diagnosis operation. FIG. 9B shows changes over time in the actually measured value Fa and the theoretical value Ft, i.e., changes over time in the force deviation $\Delta F$, during the sensor diagnosis operation. FIG. 9C shows changes over time in the actually measured value Ma and the theoretical value Mt, i.e., changes over time in the moment deviation $\Delta M$, during the sensor diagnosis operation.

In FIG. 9B and FIG. 9C, the zero point of the force sensor 5 is set such that each of the force deviation $\Delta F$ and the moment deviation $\Delta M$ in the initial posture is zero. When the set values of the load 11 are correct and the force sensor 5 is free of distortion due to incorrect installation of the installation plate 4, each of the force deviation $\Delta F$ and the moment deviation $\Delta M$ remains zero or substantially zero.

On the other hand, when the set values of the load 11 are incorrect due to a cause such as incorrect inputs of values by a worker regarding the mass M or the position of the center of gravity (Gx, Gy, Gz), a force deviation $\Delta F$ and a moment deviation $\Delta M$ that are not zero are detected despite no force or moment being applied to the robot main body 3 from the outside. In this case, the force deviation $\Delta F$ and the moment deviation $\Delta M$ change as the posture of the robot main body 3 changes, and particularly the moment deviation $\Delta M$ changes greatly as the turning body 7 rotates.

Further, when the force sensor 5 is distorted due to incorrect installation of the installation plate 4, a force deviation $\Delta F$ and a moment deviation $\Delta M$ that are not zero are detected despite no force being applied to the robot main body 3 from the outside. In this case, the force deviation $\Delta F$ and the moment deviation $\Delta M$ change as the posture of the robot main body 3 changes, and particularly the force deviation $\Delta F$ changes greatly as the first arm 8 rotates.

Next, the determination unit 24 compares the moment deviation $\Delta M$ with a predetermined first threshold value Th1 (step S4) and determines whether the set values of the load 11 are correct. Specifically, when the moment deviation $\Delta M$ remains equal to or smaller than the first threshold value Th1 throughout a period in which the posture of the robot main body 3 changes, it is determined that the set values of the load 11 are correct. On the other hand, as shown in FIG. 9C, when there is a period in which the moment deviation $\Delta M$ is larger than the first threshold value Th1 during the period in which the posture of the robot main body 3 changes, it is determined that the set values of the load 11 are incorrect.

Subsequently, the determination unit 24 compares the force deviation $\Delta F$ with a predetermined second threshold value Th2 (step S5 or S6) and determines whether the force sensor 5 is distorted due to incorrect installation of the installation plate 4. Specifically, when the force deviation $\Delta F$ remains equal to or smaller than the second threshold value Th2 throughout a period in which the posture of the robot main body 3 changes, it is determined that the force sensor 5 is not distorted. On the other hand, as shown in FIG. 9B, when there is a period in which the force deviation $\Delta F$ is larger than the second threshold value Th2 during the period in which the posture of the robot main body 3 changes, it is determined that the force sensor 5 is distorted.

When it is determined that the set values of the load 11 are correct and that the force sensor 5 is not distorted (YES in step S4 and YES in step S5), the determination unit 24 determines that the detection accuracy of the force sensor 5 is "acceptable." Then, the notification unit 25 notifies that the diagnosis result is "acceptable" (step S7), and the diagnosis method of the force sensor 5 ends.

When it is determined that the set values of the load 11 are correct (YES in step S4) and that the force sensor 5 is distorted (NO in step S5), the determination unit 24 determines that the detection accuracy of the force sensor 5 is "not acceptable." In this case, the cause for being "not acceptable" is distortion of the force sensor 5 due to incorrect installation of the installation plate 4. Therefore, the determination unit 24 selects "mode 3" corresponding to incorrect installation of the installation plate 4, and the notification unit 25 notifies that the diagnosis result is "mode 3" (step S8). In this case, a correction method of checking the installation state of the installation plate 4 is notified along with the diagnosis result.

When it is determined that the set values of the load 11 are incorrect (NO in step S4) and that the force sensor 5 is not distorted (YES in step S6), the determination unit 24 determines that the detection accuracy of the force sensor 5 is "not acceptable." In this case, the cause for being "not acceptable" is incorrect set values of the load 11. Therefore, the determination unit 24 selects "mode 2" corresponding to incorrect set values of the load 11, and the notification unit 25 notifies that the diagnosis result is "mode 2" (step S9). In this case, a correction method of checking the set values of the load 11 is notified along with the diagnosis result.

When it is determined that the set values of the load 11 are incorrect and that the force sensor 5 is distorted (NO in step S4 and NO in step S6), the determination unit 24 determines that the detection accuracy of the force sensor 5 is "not acceptable." In this case, the cause for being "not acceptable" is incorrect installation of the installation plate 4 and incorrect set values of the load 11. Therefore, the determination unit 24 selects "mode 1" corresponding to incorrect installation of the installation plate 4 and incorrect set values of the load 11, and the notification unit 25 notifies that the diagnosis result is "mode 1" (step S10). In this case, a correction method of checking the set values of the load 11 and executing the diagnosis again is notified along with the diagnosis result.

When the diagnosis result is "not acceptable," a worker corrects the set values of the load 11 or the installation state of the installation plate 4 in accordance with the correction method notified by the notification unit 25, and then executes the diagnosis method of the force sensor 5 again (YES in step S11). Until the diagnosis result becomes "acceptable," the worker repeatedly corrects the set values of the load 11 or the installation state of the installation plate 4 and executes the diagnosis.

As has been described, the detection accuracy of the force sensor 5 can decrease due to distortion of the force sensor 5 attributable to incorrect installation of the installation plate 4 as well as due to incorrect setting of the set values of the load 11. When the robot main body 3 operates in a state where the detection accuracy of the force sensor 5 has decreased, a situation can arise where, for example, contact is detected despite the robot main body 3 not contacting any object or person and consequently the robot main body 3 stops. Therefore, to allow the robot 1 to operate normally, it is necessary to check that the detection accuracy of the force sensor 5 meets a required criterion before the robot main body 3 starts operating. However, it is not easy for a worker to identify the cause for the decrease in detection accuracy, for example, based only on the force deviation $\Delta F$ and the moment deviation $\Delta M$.

According to this embodiment, in the sensor diagnosis operation, the force and the moment are detected by the force sensor 5 while the posture of the robot main body 3 is changed, and the force deviation $\Delta F$ and the moment deviation $\Delta M$ are measured. When the set values of the load 11 are incorrect, particularly the moment deviation $\Delta M$ becomes large, and when the force sensor 5 is distorted, particularly the force deviation $\Delta F$ becomes large. Therefore, it is possible to determine whether the set values of the load are correct and whether the force sensor 5 is distorted based on the moment deviation $\Delta M$ and the force deviation $\Delta F$. Further, the cause for the decrease in the detection accuracy of the force sensor 5 can be identified by a simple operation of the robot main body 3 and a simple calculation by the robot control device 2.

When the set values of the load 11 are incorrect, the moment deviation $\Delta M$ occurring when the turning body 7 rotates becomes large, and when the force sensor 5 is distorted, the force deviation $\Delta F$ occurring when the first arm 8 rotates becomes large. Therefore, by rotating each of the turning body 7 and the first arm 8 independently, incorrect setting of the set values of the load 11 and distortion of the force sensor 5 can be determined while being distinguished from each other.

Further, according to this embodiment, a correction method corresponding to an identified cause is notified to a worker along with the cause. This can prompt the worker to cope appropriately. By correcting appropriately in accordance with the notified correction method, the worker can reliably complete the adjustment of the detection accuracy of the force sensor 5 in a short time.

In the above embodiment, the threshold values Th1, Th2 for the deviations $\Delta M$, $\Delta F$ may be changed according to the amount of change in the posture of the robot main body 3, i.e., the amounts of rotation of the turning body 7 and the first arm 8, in the sensor diagnosis operation.

For example, the rotation ranges of the turning body 7 and the first arm 8 may be restricted due to a reason such as that there is a structure around the robot main body 3. The deviations $\Delta M$, $\Delta F$ become larger as the amounts of rotation of the turning body 7 and the first arm 8 become larger. Therefore, if the threshold values Th1, Th2 are fixed regardless of the amounts of rotation, it may not be possible to correctly determine whether the set values of the load 11 are correct and whether the force sensor 5 is distorted.

Whether the set values of the load 11 are correct and whether the force sensor 5 is distorted can be correctly determined by setting the threshold values Th1, Th2 to larger values when the amounts of rotation are larger. For example, when the amounts of rotation are smaller than 90°, the threshold values Th1, Th2 may be set in proportion to the amounts of rotation such that the threshold values Th1, Th2 become smaller as the amounts of rotation become smaller.

In the above embodiment, the determination unit 24 determines the detection accuracy of the force sensor 5 in the two levels of "acceptable" and "not acceptable," but may instead determine the detection accuracy in three or more levels. For example, as shown in FIG. 10, the determination unit 24 may determine the detection accuracy in the four levels of "excellent," "good," "poor," and "bad." In this example, when the detection accuracy is "poor" or "bad," a mode and a correction method are notified by the notification unit 25.

According to this configuration, a worker can more specifically recognize the degree of the detection accuracy of the force sensor 5 based on a more detailed determination result.

In the above embodiment, the force deviation $\Delta F$ and the moment deviation $\Delta M$ are continuously detected while the posture of the robot main body 3 changes. Instead, the force deviation $\Delta F$ and the moment deviation $\Delta M$ may be detected only when the posture of the robot main body 3 is a predetermined posture.

For example, the force deviation $\Delta F$ and the moment deviation $\Delta M$ may be detected at two times-of-day at which the posture of the robot main body 3 is the first posture and the second posture, and the determinations of step S4 to step S6 may be executed using the difference between the deviations at the two times-of-day.

In the above embodiment, the determination unit 24 determines both whether the set values of the load 11 are correct and whether the force sensor 5 is distorted. Instead, the determination unit 24 may determine only whether the force sensor 5 is distorted.

Also when the determination result to be notified is only whether the force sensor 5 is distorted, it is possible to help a worker identify the cause for a decrease in the detection accuracy of the force sensor 5 and prompt the worker to cope appropriately.

In the above embodiment, the force sensor diagnostic device is realized as a part of the functions of the robot control device 2. Instead, the force sensor diagnostic device may be a part separate from the robot control device 2. For example, a force sensor diagnostic device including the calculation unit 23, the determination unit 24, and the notification unit 25 may be disposed outside the robot control device 2 and connected to the robot control device 2.

In the above embodiment, the robot 1 is a six-axis vertical articulated robot. Alternatively, the robot 1 may be a vertical articulated robot with a number of axes other than six or may be a robot with a different articulated configuration.

The invention claimed is:

1. A force sensor diagnostic device that diagnoses a force sensor provided in a robot, the force sensor disposed in a proximal end side of the robot and detecting a force and a moment applied to the robot from an outside, the force sensor diagnostic device comprising:
a robot-motion controller configured to cause, based on a motion program, the robot to perform a sensor-diagnosis motion for diagnosing the force sensor; and
one or more processors, wherein the one or more processors are configured to conduct:
a calculation process that calculates a theoretical detection value of the force and a theoretical detection value of the moment of the force sensor;
a determination process that determines whether a distortion due to anchor bolts, which fix the proximal end side of the robot to an installation surface, is caused in the force sensor or not by comparing an actually measured value of the force and an actually measured value of the moment detected by the force sensor with the theoretical detection value of the force and the theoretical detection value of the moment; and
a notification process that notifies a determination result determined by the determination process.

2. The force sensor diagnostic device according to claim 1, wherein the one or more processors are configured to determine, in the determination process, whether the distortion in the force sensor is caused or not based on a moment deviation and a force deviation, the moment deviation being a magnitude of a difference between the actually measured value of the moment and the theoretical detection value of the moment, and the force deviation being a magnitude of a difference between the actually measured value of the force and the theoretical detection value of the force.

3. The force sensor diagnostic device according to claim 2, wherein
the one or more processors are configured to determine, in the determination process, that the distortion in the force sensor is not caused when the moment deviation is equal to or smaller than a predetermined first threshold value and the force deviation is equal to or smaller than a predetermined second threshold value, and
the one or more processors are configured to determine that the distortion in the force sensor is caused when the moment deviation is equal to or smaller than the predetermined first threshold value and the force deviation is larger than the predetermined second threshold value.

4. The force sensor diagnostic device according to claim 3, wherein the one or more processors are configured to determine, in the determination process, whether the distortion is caused in the force sensor based on the moment deviation and the force deviation occurring when a posture of the robot changes.

5. The force sensor diagnostic device according to claim 4, wherein the one or more processors are configured to change, in the determination process, the predetermined second threshold value according to an amount of change in the posture of the robot.

6. The force sensor diagnostic device according to claim 1, wherein
the one or more processors are configured to calculate, in the calculation process, the theoretical detection value of the force and the theoretical detection value of the moment using a set value of a load connected to the robot, and the one or more processors are configured to further determine, in the determination process, whether the set value of the load is correct by comparing actually measured values of the force and the moment with the theoretical detection values of the force and the moment.

7. The force sensor diagnostic device according to claim 6, wherein the one or more processors are configured to determine, in the determination process, whether the set value of the load is correct based on a moment deviation that is a magnitude of a difference between the actually measured value of the moment and the theoretical detection value of the moment.

8. The force sensor diagnostic device according to claim 7, wherein
the one or more processors are configured to determine, in the determination process, that the set value of the load is correct when the moment deviation is equal to or smaller than a predetermined first threshold value, and
the one or more processors are configured to determine, in the determination process, that the set value of the load is incorrect when the moment deviation is larger than the predetermined first threshold value.

9. The force sensor diagnostic device according to claim 8, wherein the one or more processors are configured to determine, in the determination process, whether the set value of the load is correct based on the moment deviation occurring when a posture of the robot changes.

10. The force sensor diagnostic device according to claim 9, wherein the one or more processors are configured to change, in the determination process, the predetermined first threshold value according to an amount of change in the posture of the robot.

11. The force sensor diagnostic device according to claim 1, wherein the one or more processors are configured to acquire, in the calculation process, information on a posture of the robot and calculates the theoretical detection value of the force and the theoretical detection value of the moment based on the acquired posture.

12. A robot control device for diagnosing a force sensor provided in a robot, the force sensor disposed in a proximal end side of the robot and detecting a force and a moment applied to the robot from an outside, the robot control device comprising:
a robot-motion controller configured to cause, based on a motion program, the robot to perform a sensor-diagnosis motion for diagnosing the force sensor; and
one or more processors, wherein the one or more processors are configured to conduct:
a calculation process that calculates a theoretical detection value of the force and a theoretical detection value of the moment of the force sensor;
a determination process that determines whether a distortion due to anchor bolts, which fix the proximal end side of the robot to an installation surface, is caused in the force sensor by comparing an actually measured values of the force and an actually measured value of the moment detected by the force sensor with the theoretical detection value of the force and the theoretical detection value of the moment; and
a notification process that notifies a determination result from the determination process.

13. The robot control device according to claim 12 wherein the one or more processors are configured to conduct a storage process that stores a set value of a load connected to the robot, wherein the one or more processors are configured to calculate, in the calculation process, the theoretical detection value of each of the force and the moment using the set value of the load stored by the storage process, and the one or more processors are configured to calculate, in the determination process, whether the set value of the load is correct by comparing actually measured values of the force and the moment with the theoretical detection values of the force and the moment.

14. The robot control device according to claim 13, wherein the robot-motion controller causes the robot to execute a sensor diagnosis operation of changing a posture of the robot and causes the force sensor to execute detection of the force and the moment while the posture of the robot changes in the sensor diagnosis operation.

* * * * *